No. 829,333. PATENTED AUG. 21, 1906.
W. H. HAMPSON.
VEHICLE JACK.
APPLICATION FILED DEC. 2, 1905.
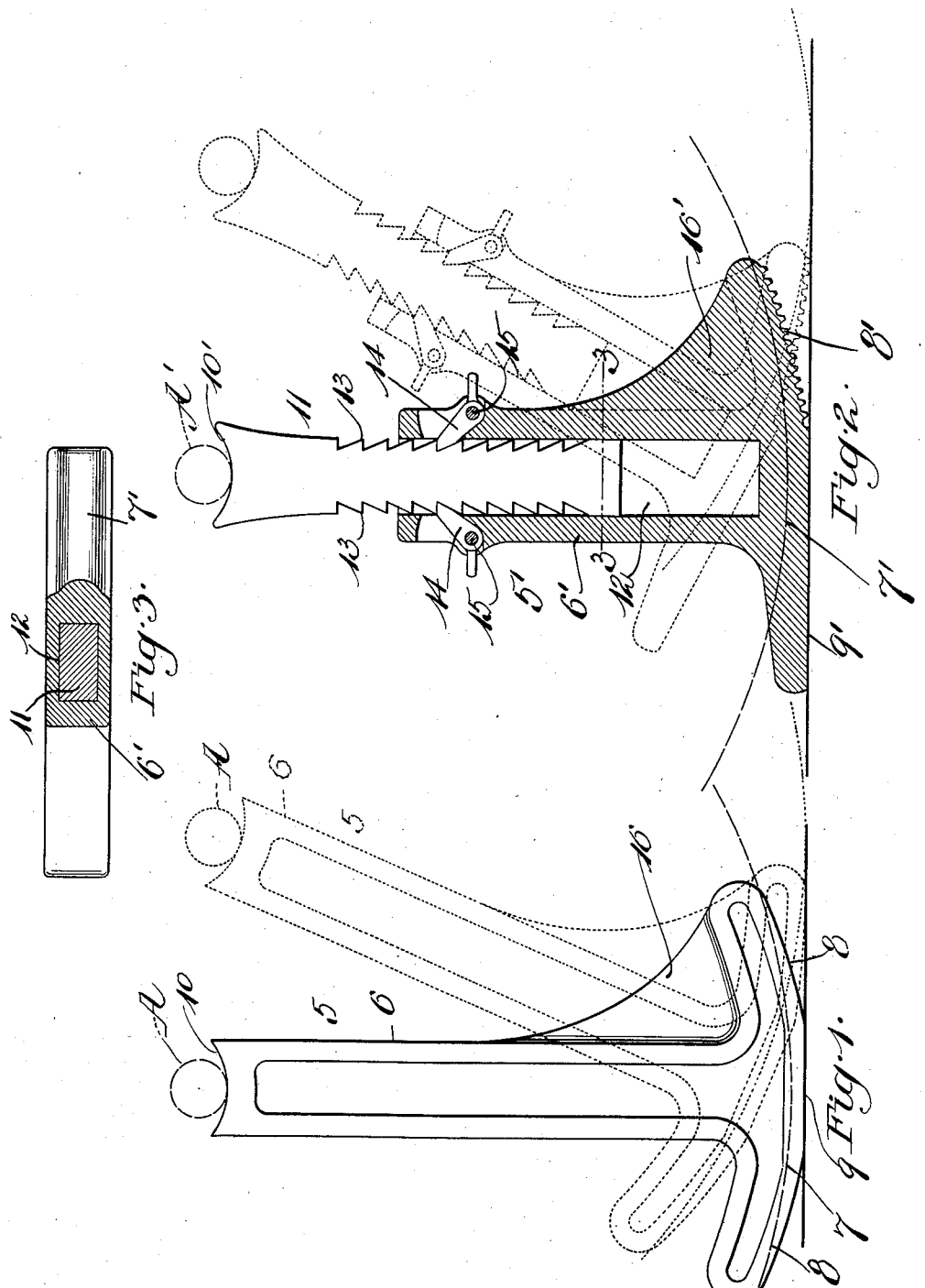
Witnesses:
William O. Glass.
Ernest A. Telfer.
Inventor:
William H. Hampson,
by his attorney, Charles S. Gooding.

UNITED STATES PATENT OFFICE.

WILLIAM H. HAMPSON, OF CAMBRIDGE, MASSACHUSETTS.

VEHICLE-JACK.

No. 829,333.　　　　Specification of Letters Patent.　　　Patented Aug. 21, 1906.

Application filed December 2, 1905. Serial No. 289,950.

*To all whom it may concern:*

Be it known that I, WILLIAM H. HAMPSON, a citizen of the United States, residing at Cambridge, in the county of Middlesex and State of Massachusetts, have invented new and useful Improvements in Vehicle-Jacks, of which the following is a specification.

This invention relates to an improved jack for vehicles, the object of the invention being to provide a cheap, simple, and easily-operated device which is particularly adapted for holding the body of an automobile or other power-vehicle raised so that the tires of the wheels of said vehicle shall not rest upon the ground or floor when said vehicle is in the garage.

The objection to the vehicles standing upon the tires for any length of time is that the tire becomes flattened at the portion thereof in contact with the ground or floor after a certain period of time, and especially is this the case where the pneumatic tire becomes partially deflated, in which case the tire is liable to become cracked or injured by the rim of the wheel.

The invention consists in the combination and arrangement of parts set forth in the following specification and particularly pointed out in the claims thereof.

Referring to the drawings, Figure 1 is a side elevation of one form of my improved vehicle-jack. Fig. 2 is a vertical section of another form of my invention, showing a portion of the vehicle-wheel in broken lines raised from the ground and also showing the jack and wheel in fine dotted lines moved forward with the periphery of the wheel just coming into contact with the floor. Fig. 3 is a section taken on line 3 3 of Fig. 2.

Like numerals refer to like parts throughout the several views of the drawings.

In the drawings, referring to Fig. 1, 5 is a jack consisting of a standard 6, having a base 7, the bottom surface 8 of said standard being convexly curved and preferably having a portion of said bottom surface flattened, as at 9. The top of the standard 6 is preferably provided with a recess 10.

The manner of operation of the jack hereinbefore specifically described is as follows:
Four jacks are used, two under each axle of the vehicle, and said jacks may be placed beneath said axles either by raising the axle with a jack and placing my improved jack thereunder, with the axle A, Fig. 1, located in the recess 10 and the jack in the position indicated in said Fig. 1, with the flat spot 9 resting upon the ground or floor, or the jacks may be placed beneath the axle, as shown in dotted lines, Fig. 1, and the vehicle pushed toward the left in said Fig. 1 until the jack assumes the position shown in full lines in said figure, rocking on its curved bottom surface from one position to the other until it finally assumes the position shown in Fig. 1 and rests upon the flattened portion 9 of said curved surface. Thus when four jacks are used in the manner last described the vehicle may be raised, together with the wheels thereof, from the ground or floor, so that the tires do not rest upon the floor. It will also be seen that in the position of the vehicle first described the tires of the wheel do not contact with the floor. When it is desired to use the vehicle, the same is pushed forward or backward, as may be desired, and the different jacks will rock upon the curved bottom surfaces 8 thereof until the periphery of the tire of each wheel rests upon the floor. The jacks are then removed, and the vehicle is ready for use.

When it is desired to raise the vehicle upon the jacks, and thus remove the tires from the floor, the four jacks are set in the position illustrated in dotted lines, Fig. 1, and the vehicle pushed toward the left until the jacks rock from the position shown in dotted lines to the position shown in full lines in said Fig. 1. The rocking of the jacks upon their curved bottom surfaces 8 raises the vehicle and the four wheels thereof from the ground until the wheels are in the position illustrated by broken lines, Fig. 1, with the tires removed from contact with the ground or floor.

In Fig. 2 a modified form of my invention is illustrated in which the jack 5' is formed in two parts—viz., a standard 6' and a holder 11. The holder 11 is adjustable longitudinally of said standard and has a recess 10' in the top thereof. Said holder is preferably rectangular in cross-section and extends downwardly into a correspondingly-shaped recess or hole 12, formed in the standard 6'. The holder 11 has formed upon its opposite sides teeth 13, which engage pawls 14, pivoted at 15 to the standard 6' These pawls serve to lock the holder against downward motion with relation to said standard 6'. The base 7' of the standard 6' has a convexedly-curved bottom surface 8', preferably provided with a flat portion 9', the surface 8' being corrugated to prevent slipping. The axle A' of the vehicle to be supported rests in the recess 10', and the operation of moving the vehicle forward, rocking the jacks with said movement of the vehicle, is precisely similar to that already described in relation to the form of my invention illustrated in Fig. 1, the only substantial difference between the two forms illustrated in Fig. 1 and in Fig. 2 being that the second form permits of adjustment in length of the jack by moving the holder 11 upwardly or downwardly in the standard 6' and then locking it against further downward motion by means of the pawls 14. The object of the flattened portions 9 and 9' of the bottom surfaces of my improved jack in the forms hereinbefore described is to hold said jack and also the vehicle supported thereby in a stationary position until sufficient force is exerted upon the vehicle to rock the jack onto its curved bottom surface and off of said flattened portion.

It will be seen that the advantages derived from the use of my improved jack are the almost instantaneous removal of the vehicle from the jacks and also a like instantaneous operation in the raising of the four wheels of the vehicle from the ground, and a further advantage resides in the fact that the device is one of extreme simplicity, strength, and cheapness.

My improved jack is weighted at one side of the median vertical plane thereof, so that in its normal position the jack may stand with the standard 6 or 6' at an angle to the floor upon which said jack rests in order that when the different jacks are placed in position for the vehicle to be raised from the floor they will all stand at an angle, and the vehicle being pushed against them the axles will contact with the depressed portion at the upper end of the standard, and by further pushing of the vehicle the four jacks will rock upon their bases and the vehicle be raised, so that the tires will not touch the floor or ground.

In the form of invention illustrated in Fig. 1 the portion 16 forms the weight hereinbefore referred to, and in Fig. 2 the portion 16' constitutes the weight by which the jack is held tipped at an angle. It will be noted that in the form of my invention illustrated in Fig. 1 the flat spot 9 is located between two convexly-curved surfaces 8 8, while in the form of my invention illustrated in Fig. 2 the flat spot 9' extends over somewhat more than one-half of the bottom surface of the jack, while the curved surface 8' extends over the remaining portion of said bottom surface; but the operation of the jack in both cases is substantially the same, the only difference being that in the form illustrated in Fig. 1 the jack can be rocked in either direction and is therefore a right and left jack, while in the form illustrated in Fig. 2 the jack can only be rocked in one direction away from the flat spot 9'.

Having thus described my invention, what I claim, and desire by Letters Patent to secure, is—

1. A vehicle-jack comprising a standard adapted to support a vehicle and having a convexly-curved bottom surface, a portion of which surface is flattened, whereby said jack may be rocked, together with said vehicle, said jack being weighted at one side of its median vertical plane, whereby the same stands normally in position to receive the axle of said vehicle when the wheels thereof are in contact with the floor.

2. A vehicle-jack comprising a standard having a recess in the top thereof adapted to receive the axle of a vehicle, the bottom surface of said jack formed on a convex curve, whereby said jack may be rocked together with said vehicle, said jack being weighted at one side of its median vertical plane, whereby the same stands normally in position to receive the axle of said vehicle when the wheels thereof are in contact with the floor.

3. In a vehicle-jack, a standard having a convexly-curved bottom surface and a holder adjustable longitudinally of said standard and adapted to support a vehicle, whereby said jack may be rocked together with said vehicle, said jack being weighted at one side of its median vertical plane, whereby the same stands normally in position to receive the axle of said vehicle when the wheels thereof are in contact with the floor.

4. In a vehicle-jack, a standard having a convexly-curved bottom surface, a portion of which surface is flattened, and a holder adjustable longitudinally of said standard, said holder having a recess in the top thereof adapted to receive the axle of a vehicle, whereby said jack may be rocked, together with said vehicle, said jack being weighted at one side of its median vertical plane, whereby the same stands normally in position to receive the axle of said vehicle when the wheels thereof are in contact with the floor.

5. A vehicle-jack comprising a standard adapted to support a vehicle and having a convexly-curved bottom surface, whereby said jack may be rocked together with said vehicle, said jack being weighted at one side of its median vertical plane whereby the same stands normally in position to receive the axle of said vehicle when the wheels thereof are in contact with the floor.

In testimony whereof I have hereunto set my hand in presence of two subscribing witnesses.

WILLIAM H. HAMPSON.

Witnesses:
 CHARLES S. GOODING,
 ANNIE J. DAILEY.